Patented Sept. 10, 1940

2,213,943

UNITED STATES PATENT OFFICE 2,213,943

MODIFICATION OF THE PHYSICAL PROPERTIES OF ISOCOLLOIDS

László Auer, Budapest, Hungary, assignor to J. Randolph Newman, trustee, Washington, D. C.

No Drawing. Application April 21, 1930, Serial No. 446,172. In Great Britain April 24, 1929

15 Claims. (Cl. 252—48)

The present invention relates to processes for the modification of the physical properties of colloidal substances, especially organic isocolloids and to the modified isocolloid products obtained. By "isocolloids" or "isocolloid substances or materials" is meant colloidal substances wherein the dispersed phase and the dispersion medium of the colloidal system thereof are both of the same chemical composition but in a different state.

In other copending applications, I have described various methods of modifying organic isocolloid materials using many different modifying agents. This application is a continuation in part of my other applications. It is in part a division and in part a continuation of Ser. No. 143,786, filed Oct. 23, 1936 and the various divisions and continuations of that generic application, particularly the continuation thereof filed April 30, 1929, Ser. No. 359,425.

As disclosed in the said copending applications, I have found that by dispersing or dissolving various modifying agents in an organic isocolloid substance, I can obtain modified products having altered physical properties, etc., which are useful in the commercial and industrial arts. The modifying agents employed are organic or inorganic compounds which are electrolytes or polar compounds containing ions, radicals or residues capable of influencing the said modification of the isocolloid substances.

The present invention is based upon my further discovery that the modified isocolloid products, obtained by the processes disclosed in my said applications, may themselves be used as modifying agents to modify the properties of the same or other isocolloid materials. That is, the modified isocolloid products, of my said copending applications, may be dissolved or dispersed in natural or artificial isocolloid materials, particularly those which contain only a relatively small amount of dispersed phase, to produce other useful modified isocolloid products, according to the present invention. The modified isocolloid product used, as the modifying agent, assists in supplying the dispersed phase in the new product. In the present method, the new modifying agent (the modified isocolloid product from prior processing) is used in much the same manner as the modifying agents in the said copending applications.

In fact, the present processes are more or less two-step methods, wherein the original modifying agent or polar compound is dispersed in the selected isocolloid material and then the product so obtained (solution or dispersion of the polar compound in the isocolloid material) is, in turn, dispersed in or blended with more of the same or a different isocolloid substance to convert the latter substance into the desired modified product.

By using a modified isocolloid product containing the polar compound dissolved therein, as the modifying agent, certain advantages are obtained. For instance, it is possible to produce the final modified products with a lighter color than can be obtained by the direct use of the original modifying agent. And frequently lower temperatures may be employed to disperse the new modifying agent in the isocolloid substance to be modified.

Various methods may be used to disperse the modifying agent in the isocolloid to be modified, so long as the polar compound becomes dispersed therein in complete (molecular or colloidal) solution.

The modifying agents (both the initial agent and the modified isocolloid product) should be added to the starting material (isocolloid substance to be modified) in a dry form (without the presence of water) and in relatively small quantities. Generally the range of proportions is from 2 to 30 parts of modifying agent to 100 parts of isocolloid substance. That is, a minor amount of modifying agent is used, in either of the two-steps of the present methods. However, a feature of one species of the present invention is to use as much as 25 to 30 per cent of the initial modifying agent in the first step to produce a greatly modified isocolloid product which, itself, is highly advantageous as a modifying agent in the second step; this feature being more fully explained post.

In order to insure complete dissolution or dispersion of these modifying agents, the operations should be carried out under the application of heat. The degree of heat required depends upon the nature of the isocolloid material being modified and the modifying agent used; by using a modifying agent which is directly soluble in the isocolloid to be modified, mere mixing is sufficient. However, the range of temperatures employed is generally from 100° to 300° C. Only occasionally is a higher temperature necessary for satisfactory results. The heat treatment promotes the complete (molecular or colloidal) dissolution of the modifying agent in the substance to be treated. In some case it may be advisable to continue the heat treatment after the dissolution or dispersion of the modifying agent is substantially complete. Thus, for instance, when the isocolloidal material being modified, is a fatty oil and the agent is dispersed in it at 200° C. or above, continued heating produces a far-going heat-bodying of the oil and in this way it is possible to produce relatively hard, solid products when desired.

I have further found that the properties of the products obtained can be influenced by the nature and physical condition of the gas present in contact with the material undergoing treatment. That is, by varying the pressure, the specific nature of the products can be somewhat changed. These processes can be effected under reduced, atmospheric or increased pressure. Generally speaking, the rarification of the gas present intensifies the actions in these processes. Thus in many cases, the heating is effected under vacuum. Likewise, the presence of air or other gases somewhat alters the results obtained. When a gas treatment is employed in conjunction with the heating, the gas is usually blown or passed through the hot mixture. Also the gas may be developed in situ, from compounds such as peroxides, carbonates, sulphides, sulphites and the like, to give the corresponding gases, according to the condition employed.

Likewise, the modifying agent may be produced in situ within the isocolloid material during the heating, by using compounds which react, under the conditions employed, to form the desired modifying agent.

In modifying the initial materials, true or colloidal solutions of one or more electrolytes in an organic solvent may be used.

Having generally set forth the procedural steps of the present invention, I will now illustrate the respective materials employed in the present methods.

The present invention may be applied to many and various natural and artificial organic isocolloids, particularly those containing unsaturated carbon compounds of high molecular weight, such as fatty oils, mineral oils, etc., as set forth in Ser. Nos. 143,786 and 359,425.

As the initial modifying agent, I may use a variety of electrolytes or polar compounds. As stated in Ser. No. 359,425 and the other said copending applications, the following classes of agents are typical.

Metal salts, particularly those of alkali metals
    salts of organic acids
    salts of inorganic acids
Mixtures of metal salts and metal peroxides
Organic acids
    aromatic
    aliphatic
Organic bases
    amines
    hydroxy compounds (phenols etc.)
Organic compounds containing both an acidic inorganic residue and an organic residue
Organic halogen compounds
    aromatic
    aliphatic
Organic sulphonic acids and their esters
Organic sulphonylchlorides
Organic esters of inorganic acids
Inorganic salts of organic bases
Nitro compounds
Diphenyl sulphides and sulphones
Metallo-organic compounds
    metal alcoholates
    aryl-metal compounds Further specific illustrations of these initially modifying agents are given post, with suitable cross reference to the related copending applications.

Obviously there are many major embodiments within the broad scope of this invention, depending upon the isocolloid substance used in the first and second steps and the initial modifying agent employed. Two major species arise, depending upon whether the same or a different isocolloid material is used in the second step; but as the isocolloid substance which is being modified in the second step, usually forms the major portion (in prepondering amount) of the final modified product, it determines the general character of the product obtained in the present processes.

The breadth of the present invention is shown by the following general illustrations of two major species thereof:

1. A minor amount of a polar compound, for instance, about 5 per cent of an organic halogen compound, is dispersed in a fatty oil and then the fatty oil having the polar compound dissolved therein, is dissolved in a major amount of refined mineral oil; say 100 parts of mineral oil to 4 parts of said fatty oil product containing the halogen compound as illustrated in Example 2 post.

2. A somewhat larger amount of an inorganic polar compound (electrolyte), for instance, 25 to 30 per cent of a metal salt of an inorganic acid, is dispersed in a fatty oil at temperatures between 250° and 300° C. to give a greatly modified heat-bodied oil product and then the said oil product dispersed in or blended with more of the same fatty oil; 100 parts of said greatly modified oil to 400 parts of additional fatty oil.

In Ser. No. 143,786 filed Oct. 23, 1926, I have described methods for the modification of fatty oils, mineral oils and other organic isocolloids by means of electrolytes or polar compounds which contain certain anions and cations, which are as follows:

Cations:
    Ammonium
    Sodium
    Potassium
    Iron
    Aluminium
    Calcium
    Cobalt
    Lead
    Antimony, etc.
Anions:
    Carbonic acid
    Tartaric acid
    Oxalic acid
    Acetic acid
    Formic acid
    Hydrochloric acid
    Hydrobromic acid
    Hydro-iodic acid
    Sulphurous acid
    Nitric acid
    Nitrous acid
    Citric acid
    Thiocyanic acid
    Salicylic acid
    Naphthalene sulphonic acid
    Sulphanilic acid
    Hydrocyanic acid, etc.

As the modifying agent, metal salts, acids or organic metal compounds, containing those ions, may be used to effect the modification of the isocolloid material, such fatty and mineral oils, etc.

The modification is effected by dispersing or dissolving the said modifying agent in the isocolloid material. This operation can be effected at temperatures between room temperature and below the boiling point of the isocolloid material and under reduced, atmospheric or increased pressure. That is, the isocolloid material and a suitable amount of said modifying agent (metal salt, etc.) are mixed together and heated, if necessary, until the agent is dispersed or dissolved in the isocolloid material, and that material is modified to the desired condition. Of course, the ratios of materials, the temperature and time of heating and the pressure are varied according to the materials used and the final product desired.

In the specific illustrations there given in Ser. No. 143,786, about 5 per cent of a metal salt is mixed with a fatty oil or a mineral cylinder oil and the mixture heated to 300°–350° C. until a modified product is obtained which, upon cooling, is more or less solidified; the heating usually being under vacuum.

That application (Ser. No. 143,786) is specifically directed to heat-bodying a fatty oil in the presence of a metal salt, which facilitates or accelerates the bodying of the oil; the invention claimed being an improvement in heat-bodying oils in the presence of such salts, particularly salts of organic acids and alkali metals.

The modified isocolloid products obtained by the processes of Ser. No. 143,786 are useful and are employed in the present invention, as modifying agents. That is, the processes of that application forms the first step of some of the present two-step methods, the modified isocolloid products thereof, here, being dispersed in more of the same or a different isocolloid material to modify the latter, as stated ante.

I have filed various divisions and continuations in part of Ser. No. 143,786, in addition to the present application. The following are in point, with the present invention in that they also disclose processes which likewise form a first step in the present methods and yield modified isocolloid products here used as modifying agents in the subsequent processing: Ser. No. 273,159 filed April 26, 1928, now Patent No. 1,985,230, Ser. No. 273,160 filed April 26, 1928, now Patent No. 1,985,231, Ser. No. 359,425 filed April 30, 1929, Ser. No. 359,426 filed April 30, 1929, now Patent No. 1,980,366, Ser. No. 359,427 filed April 30, 1929, now Patent No. 1,957,437, Ser. No. 446,170 filed April 21, 1930, Ser. No. 446,171 filed April 21, 1930, now Patent No. 1,980,367 and Ser. No. 446,174 filed April 21, 1930.

The present application is a continuation-in-part of said applications Serial Nos. 273,159; 273,160; 359,425; 359,426; and 359,427.

In Ser. No. 273,159 I disclose the use of volatile solvents to facilitate the dispersion of the electrolyte, specifically a metallo-organic compound, in the isocolloid material; the solvent being later removed during the heating of the mixture. The modified isocolloid products so obtained are sometimes vulcanized or sulphurized by mixing them with sulphur and heating the mixture to temperatures sufficient to sulphurize it, say to about 160° C. The use of a metal alcoholate, such as sodium amylate, is specifically shown to illustrate the employment of metallo-organic compounds as the modifying agent.

That application is specifically directed to methods wherein an alkali metal is added to an alcohol to form a solution of a metal alcoholate which solution is then added to a fatty oil to produce a modified fatty oil product after removal of the alcohol by distillation and wherein the modified oil product is sometimes sulphurized by heating with sulphur.

The modified isocolloid products obtained by the methods of Ser. No. 273,159 either the original or the sulphurized products are here used, as modifying agents, in the second part of the present methods; the procedures disclosed in Ser. No. 273,159 being the first steps of such embodiments of the present invention.

In Ser. No. 273,160 I have described two-step methods of modifying isocolloids such as glycerides of fatty acids, particularly fatty oils. In these two-step methods the fatty oil is first heat-bodied and then vulcanized or sulphurized; temperatures of 200° C. or above usually being employed in the first step. Specifically that application is directed to methods wherein the fatty oil is mixed with a basic modifying agent (a metal, metal oxide, metal hydroxide or organic base) and the mixture heated until a modified oil product is obtained and then that oil product vulcanized with sulphur or other sulphur compound.

Again the sulphurized modified oil products obtained by the procedures of that application can be used in the present invention as modifying agents, as stated ante. In this case the present processes become really three step methods, the fatty oil being modified with a basic modifying agent, the modified oil sulphurized and this sulphurized product dispersed in more isocolloid material to modify the latter.

In Ser. No. 359,427, I have also described processes wherein metals, metal oxides and metal hydroxides are employed as modifying agents, but there the metal, etc., is an alkali metal or the oxide or hydroxide thereof. The amount of alkali metal modifying agent employed may vary from that theoretically necessary to completely saponify the fatty oil down to about 2 per cent on the oil, thus a wide variety of modified products can be obtained. With the smaller amounts of said modifying agents there are obtained modified products comprising modified fatty oil having an alkali metal soap dispersed therein as a polar compound or modifying agent; that compound or agent being, so to speak, formed in situ. When the modified oil products are subsequently sulphurized, as disclosed, the sulphurized product comprises a mixture of metal soap and sulphurized fatty oil. In such two-step methods of modifying the fatty oil, usually 2 to 5 per cent of alkali metal compound on the oil is employed in the first step.

While temperatures between 100° and 300° C. may be used to disperse the alkali metal modifying agent in the oil and effect the desired modification, it is advantageous to use temperatures in the upper range, 200° to 300° C. With temperatures in that range, a heat-bodying or polymerization of the fatty oil or of any partially split glyceride, occurs. Thus some of the modified products of such methods are mixtures of metal soap and heat-bodied or polymerized oil, the soap being dispersed in the oil. Those modified isocolloid products can also be sulphurized as shown in Examples 4 and 5 of Patent No. 1,957,437.

Also, in the methods of Ser. No. 359,427, other agents may be added to the mixture in conjunction with the alkali metal compound, for instance, added prior to the heating. Metal peroxides, particularly alkaline earth peroxides, such as barium peroxide, may be so used. Likewise, metal-free organic materials can be so employed, for instance, any of the following compounds:

phenols
    arylamines
    hydrocarbons
    ketones
    alcohols

Among these compounds specifically mentioned, are alphanaphthol, pyrogallol, benzidine, quinoline, benzene, glycerol, etc., as being useful as additions to the mixture. When added they facilitate dissolution of the alkali metal compound in the oil. Also the final properties of the modified product are influenced when they are used.

Ser. No. 359,427 is specifically directed to methods wherein the fatty oil is mixed with a solid, substantially water-free alkaline modifying agent of the said class and the mixture heated to between 200° and 300° C. until a solidified product is obtained on cooling and wherein the modified product so obtained is sometimes vulcanized with sulphur.

Here again, the modified oil products so obtained, either before or after sulphurizing may be used in the present process, as the modifying agent in the subsequent modification of fatty oils, mineral oils, etc.

In Ser. No. 359,426, I have also described methods wherein metal peroxides are used in modifying isocolloid materials, such as, fatty oils, etc. There the metal peroxide, particularly peroxides of alkali metals of alkaline earth, of magnesium and of zinc, are used as the main modifying agent; usually from 2 to 10 per cent of metal peroxide on the oil being employed. The following peroxides are typical of those that may be used:

The peroxides of
    Magnesium
    Zinc
    Barium
    Strontium
    Calcium
    Sodium
    Nickel
    Bismuth, etc.

The alkaline earth metal peroxides are advantageous. A variety of modified oil products can be obtained depending upon the oil used (linseed oil, castor oil, etc.) and the other conditions employed. The mixture of oil and metal peroxide is heated to temperatures sufficient to disperse or dissolve the metal compound in the oil and secure the desired modification; temperatures between 200° and 300° C. being satisfactory in most cases. Those between 250° and 300° C. are advantageous. Such temperatures are within the range at which fatty oils become heat-bodied or polymerized. When the heating is effected under vacuum, improved products are obtained.

As in Ser. No. 359,427, the modified products can be sulphurized or vulcanized. Also the stated metal-free organic compounds may be used in conjunction with the metal peroxides as with alkali metal oxides, as shown ante.

Ser. No. 359,426 is specifically directed to processes wherein the fatty oil is mixed with 2 to 10 per cent of the stated class of metal peroxides and the mixture heated to between 200° and 300° C. until solidified oil products are obtained, the heating being usually under vacuum.

As before, the modified isocolloid products, either before or after sulphurization, obtained according to Ser. No. 359,426, can be used as modifying agents in the present invention, as stated ante.

In Ser. No. 446,170 I have described processes for modifying fatty oils and other isocolloid materials wherein amines are used as the modifying agents; particularly aromatic amines having a relatively high molecular weight such as mono amines of naphthalene, etc., and diamines of phenylene, diphenyl and such compounds. That application being in part a division and in part a continuation of Ser. No. 359,425, the procedural steps are much the same as in the parent application.

A wide range of amine compounds is shown in addition to the amine compounds shown in my other applications, particularly Ser. No. 359,425; some of these compounds containing primary, secondary or tertiary amine groups and several containing two or more amine groups. The following which are specifically mentioned, are typical of those that may be used:

Mono-aromatic amines
    alpha naphthylamine
    beta naphthylamine
    and naphthylamine also containing sulphonic hydroxy and other substituent groups
Phenylene diamines $H_2N-R-NH_2$
    para-phenylene diamine
    ortho-phenylene diamine
    meta-phenylene diamine
    para-tolylene diamine
Diphenyl diamines $H_2N-R-R-NH_2$
    benzidine
    dianisidine Diphenyl diamines of complex structure having the two phenyl groups connected with a "bridge" linkage.

$H_2N-R-X-R-NH_2$
pp-diamino-diphenyl methane $(X=CH_2)$
pp-diamino-diphenyl ether $(X=O)$
pp-diamino-diphenyl sulphide $(X=S)$
pp-diamino-diphenyl amine $(X=NH)$
pp-diamino-diphenyl urea
    $(X=-HN-CO-NH-)$
pp-diamino-diphenyl thiourea
    $(X=-HN-CS-NH-)$
pp-diamino-diphenyl benzophenone $(X=CO)$ It is to be noted that in some of these compounds sulphur is present in the molecule in addition to the amine groups. Some contain secondary amine groups in addition to the primary amine group. In addition to these, amines of even more complex structure may be used.

The following are illustrative of such compounds:

Michler's ketone
Michler's hydrol
safranine
1:4' diaminoanthraquinone
diamino dihydroxy anthraquinone-disulphonic acid
diamino tetrahydroxyanthraquinone-disulphuric acid
p-diamino-dimethyl carbazole
eurhodine
diaminodephenazine
diaminofuchronimine In all of these diamines the two amine groups are joined by an aromatic nucleus comprising one or more phenyl groups, the general formula being H₂N—Q—NH₂ wherein Q is an aromatic group.

One of the advantages of the amines as modifying agents is that they are relatively easier to dissolve or disperse in fatty oils and other isocolloids to modify them.

The amines may be used by themselves or in conjunction with other modifying agents, etc., in modifying isocolloid materials. For instance, the amines may be used in combination with compounds comprising within the molecule an acidic inorganic residue and an organic residue, such as an organic halogen, etc. Sometimes it is advantageous to use as the modifying agent an organic compound containing both an amine group and an acidic residue, such as amino-aromatic sulphonic acids.

Ser. No. 446,170 is specifically directed to methods wherein a fatty oil is mixed with a small amount, usually 1 to 10 per cent, of an amine of high molecular weight, particularly a diamine having the phenyl groups connected by said bridge structure, and the mixture heated to 200° C. or above, until a solidified product is obtained upon cooling and wherein the modified oil product is sometimes sulphurized.

The modified isocolloid products so obtained, either the unsulphurized or sulphurized products, may be used in the present invention as a modifying agent to modify other or more isocolloid material.

In Ser. No. 359,425, upon which the present application directly depends, I have described many illustrations of my broad invention in modifying isocolloids and listed a large number of typical isocolloid materials and modifying agents that may be employed in these processes.

There I have given a typical list of fatty oils that may be used, it being as follows:

tung oil
linseed oil
castor oil
fish oils (train oils)
poppyseed oil
sunflower oil
rapeseed oil
walnut oil
corn oil
olive oil In the above list the ease of transformation under equal conditions decreases in the order given; the first mentioned oils are most rapidly attacked and give the hardest final products, whilst the oils at the end of the series are attacked more slowly and give less solid products. As further examples of isocolloids which can be modified by these processes, I there mentioned rubber, mineral oils, asphalts, pitches, resins (those of American, French and Spanish origin), etc.

In that application, in addition to the modifying agents, shown in the prior applications, I give a further number of illustrative compounds, some inorganic, some organic and others containing both organic and inorganic groups; a large number of the latter group being shown to illustrate the various classes that are applicable to these methods. Most of the modifying agents disclosed are compounds comprising, within the molecule, an acidic inorganic residue and an organic residue: by an acidic inorganic residue I mean such an inorganic residue as can be converted, by the addition of one or more hydrogen atoms, into an inorganic acid. They are advantageous as a class in their being somewhat easier to disperse in the isocolloid material and are polar compounds, their generic formula being as follows: A—X wherein A represents the organic residue and X represents the acidic inorganic residue.

The modifying agents may be classified in various ways, according to the groups present in the molecule. The following is one broad classification of the compounds specifically mentioned:

metal salts of inorganic acids
metal salts of organic acids
organic salts of organic acids
organic salts of inorganic acids
organic bases
organic acids
organic halogen compounds
organic nitro compounds
metallo-organic compounds Of the metal salts the following are specifically mentioned as illustrative of the generic and subgeneric classes:

ammonium iodide
magnesium sulfate
magnesium chloride
zinc carbonate
zinc bromide
sodium sulphide
barium sulphide
barium thiocyanate
lead chromate
potassium dichromate
cadmium sulphide
sodium bicarbonate
lithium sulphite
tin carbonate
tin sulphite
tin sulphide
antimony sulphide
zinc sulphide
barium sulphide
barium carbonate
calcium sulphite
strontium sulphite
magnesium sulphite
barium sulphite
lead sulphite
cadmium sulphite
mercuric sulphate
sodium 2:6:8 naphthylamine disulphonate
sodium 2:6:8 naphtholdisulphonate
sodium 1:8:3:6 aminonaphtholdisulphonate
sodium 1:5 naphtholsulphonate
sodium 2:3:6 naphtholdisulphonate
sodium 2:6 naphthol sulphonate A number of organic halogen compounds, both aromatic and aliphatic, containing chlorine, iodine, etc., are given, of which the following are illustrative:

o-dichlorobenzene
p-dichlorobenzene
trichlorobenzene
naphthalene tetrachloride
pinene hydrochloride
4-chloro-o-anisidine
p-nitro-chloro-benzene
triphenyl-chloro-methane benzoyl chloride
benzyl chloride
acetyl chloride
chloral hydrate
trichloroacetic acid
monochloroacetic acid
m-nitroaniline hydrochloride
diphenylamine hydrochloride
diphenylamine trichloroacetic
trichloroaniline hydrochloride
diphenylamine hydrobromide
iodoform
2:5 dichlorbenzene sulphonic acid
benzene sulphonyl chloride
p-toluene sulphonyl chloride
naphthalene-1-sulphonyl chloride
ethylchlorsulphonate From the above list, it is clear many of the organic halogen compounds contain other substituents in addition to the halogen, such as hydroxy, amino, nitro, alkyl, aryl, and other groups. Therefore they may be also classified in other groupings of these modifying agents. Likewise, it is clear that the organic halogen compounds shown contain varying percentages of halogen; compounds containing 1 to 4 atoms of halogen in the molecule being set forth. Some of the halogen compounds are di- and triphenyl compounds, whereas others contain only a single benzene nucleus.

Another general class of modifying agents mentioned is that of the esters of inorganic acids, both aryl and alkyl esters being shown. Of that class the following compounds are illustrative:

triphenyl phosphate
tricresyl phosphate
nitrocresol carbonate
ethyl chlorsulphonate
dimethyl sulphate Still another general class is that of the inorganic salts of organic bases. Several illustrative examples of such compounds are mentioned, the following being typical:

m-nitroaniline hydrochloride
diphenylamine hydrochloride
diphenylamine hydrobromide
trichloroaniline hydrochloride
diphenylamine sulphate
diaminodiphenylamine sulphate
aniline sulphate
amino-azo-benzene sulphate As examples illustrative of organic salts of organic acids, there are mentioned diphenylamine trichloroacetate and methyl p-toluene sulphonate.

A further important general class is that of organic acids. A number of compounds has been given, both aromatic and aliphatic, to illustrate this class and the sub-classes thereof; the following being typical:

monochloroacetic acid
trichloroacetic acid
formic acid
oxalic acid
2:3 hydroxynaphthoic acid
sulphosalicylic acid
alpha-naphthyl sulphamic acid
benzene sulphonic acid
p-toluene sulphonic acid
2:5 dichlorobenzene sulphonic acid
m-xylidine sulphonic acid p-toluidine m-sulphonic acid
naphthalene 2:6 sulphonic acid
beta-naphthol 1:5 sulphonic acid
beta-naphthol 3:6:8 sulphonic acid
beta-naphthylamine 3:6:8 trisulphonic acid
2:1 naphthylamine sulphonic acid
2:6 naphthylamine sulphonic acid
2-phenylamino-8-naphthol-6-sulphonic acid The above aromatic sulphonic acids, together with their esters and halides, form another sub-class which may be represented by the following formula

R—SO$_n$—X wherein R represents an aryl nucleus, X represents hydrogen, chlorine or alkyl group and $n$ is 2 or 3. The methyl-p-toluene sulphonate and ethyl chlorosulphonate, mentioned ante, are illustrative of the esters. As illustrative of the halide compound, a number of compounds are given, the following being typical of the class of sulphonyl chlorides:— benzene sulphonyl chloride
p-toluene sulphonyl chloride
naphthalene-1-sulphonyl chloride As in Ser. No. 446,170 various amines may be used as the modifying agent, as well as other organic bases, although they are mainly used in conjunction with another modifying agent in Ser. No. 359,425. Thus the following compounds are mentioned as illustrative of the organic bases useful in the methods of that application:

dinitroaniline
diamino-diphenyl sulphide
diamino-diphenyl sulphone
benzidine
alpha-naphthol
phenol
cresol
pyrogallol
glycerol
quinoline Clearly a wide range of organic bases may be employed, according to the type of modified iso-colloid product to be obtained from a given starting material. Also the use of aryl-hydroxy compounds, as the modifying agent, is further illustrated by the following compounds in addition to those given ante:

2:3-hydroxynaphthoic acid
and the other hydroxy naphthalene compounds given ante
o-nitrophenol
p-nitrophenol The latter two compounds are nitro-aryl compounds and are also illustrative of that class of modifying agent, which is further illustrated by the following compounds:

p-nitro acetanilide
dinitroaniline
nitrocresol carbonate
m-nitroaniline hydrochloride Ser. No. 446,174, a division of Ser. No. 359,425, is directed to the use of nitro-aryl and hydroxy-aryl compounds, particularly aryl compounds containing both a nitro and a hydroxy group, as the modifying agent. As there pointed out, modified products can be obtained by employing as the modifying agent, a compound which is soluble in the solvent in question. That same principle may be applied in the present invention, as the modified products are here subsequently dispersed or dissolved in a larger quantity of isocolloid material; it being especially advantageous when the second isocolloid material is different from that employed in obtaining the initial modified isocolloid product.

Ser. No. 359,425 being a generic application, I have there extensively illustrated the many classes and sub-classes of modifying agents that can be employed in these inventions relating to the modification of isocolloid materials, either natural or artificial. Many of the modifying agents specially shown contain two or more groups, characteristic of the various classes set forth.

As there stated, mixtures of modifying agents may be used. For instance, some of the organic modifying agents may be used in conjunction with the metal salts; the former assisting in dispersing the metal salt in the isocolloid material as illustrated therein. When organic compounds are used in conjunction with a modifying agent, I generally designate such compounds as "auxiliary agents" or "sensitizers". Most of the specific compounds given to illustrate the use of such sensitizers, are themselves modifying agents capable of being used alone. Others, such as benzene, function mainly as solvents.

As further shown, the modified isocolloid products may be vulcanized or sulphurized. This sulphurization may be effected by means of sulphur, sulphur chloride, etc. It may be accelerated by using vulcanization accelerators, such as piperidine pentamethylenedithiocarbamate
tetramethyl thiuram disulphide
heptaldehydeaniline
mercaptobenzthiazole Various mixtures of vulcanized and unvulcanized products or of two different vulcanized products may be compounded to give special modified materials. Also, I have mentioned that antioxidants such as p-aminophenol, hydroquinone, etc., may be added during said treatments.

In the methods of Ser. No. 359,425, usually from 2 to 10 per cent of modifying agent is used, although in some cases as much as 30 per cent may be employed. The temperatures may range from 100° to 300° C., depending upon the materials used and the modification desired, and the treatment may be effected under reduced atmospheric or increased pressure.

Ser. No. 359,425 is specifically directed to processes wherein a minor amount of a polar compound (2 to 10 per cent of a metal salt of an inorganic acid) is mixed with a fatty oil and the mixture heated to 200° C. or above until a modified heat-bodied oil product is obtained and wherein the modified product is sometimes sulphurized.

The modified isocolloid products, either before or after being vulcanized, obtained by the methods of Ser. No. 359,425, may be used in the present processes, as modifying agents to modify more of the same or a different isocolloid material, as stated ante.

When the methods and materials of Ser. No. 359,425 are used in conjunction with the present procedures, I can obtain a variety of new products, even from isocolloid materials initially containing but little dispersed phase. Thus if a minor amount of a polar compound, for instance, an organic halogen compound easily soluble in mineral oil, as pointed out ante, be first dispersed in a mineral oil according to Ser. No. 359,425 and then that modified isocolloid dissolved in refined mineral oil, I obtain a lubricant which comprises a major amount of mineral oil and a minor amount of organic halogen dissolved therein. On the other hand, if the organic halogen compound be first dispersed in a fatty oil by heating such a mixture to 200° C. until a heat-bodied oil product is obtained and then this oil product dispersed in the refined mineral oil, I obtain an improved compounded mineral oil which also contains a bodied fatty oil dissolved in the mineral oil, in addition to the halogen compound. Example 2, given post, illustrates the production of an improved mineral oil lubricant in this way; the lubricant thus obtained having certain advantageous properties, it being ash-free, etc. Again, if the modified heat-bodied fatty oil is sulphurized before it is dispersed in the mineral oil, then the compounded oil composition in addition to the mineral oil contains a minor amount of both an organic halogen compound or other polar compound and a sulphurized fatty oil. A wide range of compounded mineral oil products can be obtained by the present invention, depending upon the body and other characteristics desired.

In addition to the compounded lubricants illustrated in Examples 1 to 4 post, many other useful and different modified products can be obtained from isocolloid materials by the two-step methods of the present invention; from materials other than fatty and mineral oils.

As illustrative of isocolloid materials which may be used in either step of the processes of this invention or in both steps thereof, are the following:

Fatty oils and like glycerides, either animal or vegetable
Animal and vegetable waxes
Natural resins, such as rosin
Synthetic resins containing natural resins as a component thereof
Artificial products made from and containing the acids of fatty oil and resins and their derivatives
Heavy mineral oils containing naphthenic bodies
Certain mineral products, such as cylinder oils, refined mineral oils, etc.
Goudron (petroleum distillation residues)
Asphalt
Tar
Pitches
Rubber and rubber-like hydrocarbons
Chemically pure isocolloid bodies, such as styrene, etc.

Clearly many different modified isocolloid products can be obtained from the various combinations of these with the said modifying agents, and products useful in the manufacture of rubber compositions, linoleum, varnishes, etc., obtained within the broad scope of this invention.

Plastic and liquid coating compositions are easily produced for a variety of industrial purposes and applications. For instance, it is possible to dissolve 25–30 parts of sodium sulphide in 100 parts of linseed oil at temperatures of 250 to 300° C. and obtain a very hard, bees-wax-like product. Then by dispersing this greatly modified product in a further 400 parts of linseed oil at moderate temperatures (by simply melting together both ingredients), a product may be obtained which is similar to a linseed oil solidified with the aid of 5 per cent of sodium sulphide but which is much lighter in color. Besides the lighter color, it can be seen that the amount of heat necessary is greatly reduced by the improved process. It should be mentioned that the greatly modified linseed oil product acts partly as a dispersed phase in the linseed oil and enables it to undergo colloidal changes. Likewise, if 100 parts of linseed oil are modified with 30 parts of benzidine base, a product is obtained which, when heated with 500 parts of linseed oil, gives a product with a lighter color than that obtainable by modifying linseed oil directly with 5 per cent benzidine base, alone. Such products are useful in making coating compositions.

In other words, in my prior processes when a greatly modified product was to be produced from an isocolloidal material containing only a little dispersed phase, such as linseed oil, beside the dispersion of the modifying agent in it, an increase in the concentration of the dispersed phase was also necessary. Both actions were obtained side by side, by heating to rather high temperatures and continuing the heating until great modification was obtained. Further, with inorganic modifying agents, relatively long heating at such temperatures was necessary. Long heating at high temperatures is undesirable, as it may cause discoloration, i. e., darkening of the product, due to charring of small particles of the oil by over-heating a portion of the oil. By the present two-step methods this is avoided and light colored products easily obtained.

Likewise, the dispersed phase in refined mineral oils is very small and the present methods are applicable to them. It has been found that by dissolving the greatly modified fatty oil products in small percentages in such mineral oils, it is possible to increase their viscosity or body. If the solidified modified oil products are hard enough or when the percentage dissolved in the mineral oil is increased, it is possible to produce pasty, jelly-like materials which can be used as lubricating greases. Such increase in the viscosity of lubricating oils has considerable importance in industry. In the cases of lubricants it is very important that the lubricating oil should not emulsify readily with water and thus be washed out from engines exposed to weather. I have found that solidified oils or modified resins which contain modifying agents insoluble in water are especially advantageous for the use as thickening agents for mineral oils, as the lubricants so obtained do not show any emulsifying capacity with water. A further important point regarding lubricants is the requirement that they should be ash-free as the ash content has been found to damage the metal parts to be lubricated. From this point of view metal-free organic modifying agents, such as aromatic amines, for instance benzidine base, are advantageously used in the modifying process of the fatty oils or resins to be used in connection with mineral oils, it has been further found that the presence of saponifiable matter in a lubricating oil is also disadvantageous to a certain extent, for on contact with alkali there is a tendency to form soaps, which lead by the action of water to emulsions. I have found that amongst the organic reagents, especially those comprising within the molecule an acidic inorganic residue, and an organic residue, as above mentioned, for instance aromatic sulphonic acids, sulpho chlorides, etc. are reagents which produce unsaponifiable products equally from fatty oils and from resins. Such products can, therefore, be used with great advantage as thickening agents for lubricating purposes in mineral oils.

As to the present invention, in its broad scope, it should be mentioned that thickened oils (stand oils or blown oils) yield especially good results with the new method. Such thickened oils are generally prepared by blowing air or another gas (carbon dioxide, nitrogen, hydrogen, sulphur oxide, etc.) through the oil to be thickened at room temperature or at elevated temperature.

In the first step of the present processes (preparation of the modified isocolloid products subsequently used as a modifying agent) part of the modification may be obtained by vulcanizing or sulphurizing the oil, etc. To effect this sulphurization, sulphur may be added as such or in the form of a sulphur compound which, under the conditions of the process, decomposes with liberation of nascent sulphur. This may be done by adding sulphur to the initial substance in addition to the modifying agents mentioned ante. Again the sulphur or sulphur compound may be added either at the beginning of the process or so as to act only during the gas treatment of the process. Alternatively, the sulphur or sulphur compound may be added to the material after the main reaction of the process has been completed.

Vulcanization accelerators may be used, for instance:

triphenylguanidine
mercaptobenzthiazole
tetraethylthiuram disulphide

Sulphurization at temperatures below 100° C. may be obtained by using super-accelerators such as, piperidine pentamethylene dithiocarbamate and diethylammonium diethyldithiocarbamate.

The final products obtained by the present two-step methods, with the exception of those obtained from refined mineral oils, may be advantageously vulcanized as a subsequent step and used in the vulcanized condition in the rubber trade or in the manufacture of varnishes. Here again, vulcanization accelerates and activators (zinc oxide, etc.) may be used.

Improved products may, in many cases, be obtained by subjecting the materials undergoing treatment, in either step, to the influence of a short-wave radiation such as X-rays, ultra-violet rays, etc. or by making them part of an electric circuit.

Improved products are obtained in some cases by passing a gas (sulphur dioxide, hydrogen sulphite, nitrogen, etc.) through the mixture while it is being heated.

The invention is illustrated by the following examples, to which, however, it is not limited. The parts are by weight.

In preparing the modified isocolloid product here used as a modifying agent, the methods of the specific examples of Ser. No. 359,425 may be employed to obtain the solidified fatty oils containing the polar compound dispersed therein.

*Example 1*

100 parts of refined mineral oil are treated with 5 parts of linseed oil which has been solidified with the aid of 5 per cent of lithium sulphite, (obtainable by heating 5 parts of lithium sulphite with 100 parts of linseed oil under vacuum to 290–310° C.—see Example 9 of Ser. No. 359,425), under the application of heat until the latter is completely dissolved in the mineral oil; 2 hours at 160° C. are satisfactory. The treatment can be carried out with advantage under vacuo. A thin gel is obtained. When instead of 5 parts only 3 parts of the above solidified linseed oil is used a viscous liquid is obtained instead of the gel.

*Example 2*

100 parts of refined mineral oil are heated together with 4 parts of linseed oil solidified with the aid of 5 per cent of 2:5-dichlorobenzene sulphonic acid, (obtainable by heating 5 parts of said sulphonic acid with 100 parts of linseed oil under vacuum to 280–310° C.—see Example 3 of Ser. No. 359,425), under vacuo between 230° C. and 240° C. for about 4 hours. A dark oil results, which is thicker than the original mineral oil, is ash-free, and does not show a considerable amount of saponifiable matter.

*Example 3*

100 parts of thin refined mineral oil are heated together with 2 parts of linseed oil solidified with the aid of 5 per cent benzidine base, (obtainable by heating 5 parts of benzidine base with 100 parts of linseed oil under vacuum to 280–300° C.—see Example 1 of Ser. No. 446,170), for 2½ hours at approximately 200° C. The resulting product is thicker than the original oil and does not form an emulsion when stirred with water.

*Example 4*

100 parts of refined mineral oil are heated together with 4 parts of linseed oil solidified by the aid of 5 per cent p-nitroacetanilide, (obtainable by heating 5 parts of p-nitroacetanilide with 100 parts of linseed oil under vacuum to 280–310° C.—see Example 6 of Ser. No. 359,425), at 250° C. The solidified linseed oil product was divided in half; the first half (2 parts) was added, and the mass heated for 2½ hours, followed by the addition of the second half, and heating for a further 1 hour. A thick oil results, which does not emulsify in water.

It is advisable in many cases to exclude air from the reaction, and to carry out the heat treatment under vacuo for this reason. Lower temperatures than 200° C. give also satisfactory results.

Other modified products may be obtained using similar procedures.

What I claim is:

1. In the manufacture of oil products having increased viscosity and body from liquid oils, the process which comprises heating a fatty oil with 2 to 30 percent of an organic sulphonic acid compound of the class consisting of aromatic sulphonic acids, their halides and esters, to temperatures between 100 and 300° C. until said organic sulphonic acid compound is distributed uniformly in said fatty oil, thus producing a greatly modified body, and then distributing said modified body throughout a relatively large amount of a liquid oil to produce said oil product.

2. In the manufacture of modified products from mineral oils, said products having lubricating properties, the process which comprises heating together a fatty oil with an aromatic sulphonic acid, until a greatly modified body is formed, and then admixing and dispersing said modified body in a relatively large amount of mineral oil, thus producing said modified products.

3. The process of claim 2, in which the said aromatic sulphonic acid is 2:5-dichlor-benzene sulphonic acid.

4. In the manufacture of modified products from mineral oils, such products being useful as lubricants, the process which comprises mixing linseed oil with about 5 percent of 2:5 dichlorobenzene sulphonic acid, heating the so treated linseed oil to a temperature between 230° and 240° C. under vacuo until a solidified, modified product is obtained, mixing about 4 parts of said solidified modified product with about 100 parts refined mineral oil, heating the mixture thus obtained for about four hours to produce a modified mineral oil, said modified mineral oil being thicker than the original mineral oil, being ash free and being practically free of saponifiable matter.

5. In the manufacture of modified products from mineral oils, said products being suitable for lubricating purposes, the process which comprises heating together an aromatic sulphonic acid with a fatty oil to produce a modified unsaponifiable product, adding said product to mineral oils to thicken said mineral oils, thus producing said modified products suitable for lubricating purposes.

6. In the manufacture of modified products from mineral oils, said products being suitable for lubricating purposes, the process which comprises heating together an aromatic sulphochloride with a fatty oil to produce a modified unsaponifiable product, adding said product to mineral oils to thicken said mineral oils, thus producing said modified products suitable for lubricating purposes.

7. In the manufacture of compounded mineral oils having increased viscosity and other improved properties, the improvement which comprises dispersing a minor amount of a thickened, non-oxidized, heat-bodied fatty oil in a mineral oil, the said heat-bodied fatty oil containing an organic polar compound dissolved therein.

8. The process of claim 7 wherein said solid, heat-bodied fatty oil contains dispersed therein a solid, metal-free aromatic polar compound, the said heat-bodied fatty oil being obtainable by heat-bodying the fatty oil in the presence of said polar compound in a dry condition.

9. The process of claim 7, wherein said heat-bodied oil contains an organic halogen compound dissolved therein.

10. In the manufacture of compounded mineral oils, useful as lubricants, the improved process which comprises first heat-bodying a fatty oil in the presence of 2 to 30 percent of a dry polar compound to produce a thickened, non-oxidized, heat-bodied fatty oil containing a polar compound dissolved therein and then dispersing a minor amount of said heat-bodied oil containing the polar compound dissolved therein, in a mineral oil, to produce said compounded lubricant.

11. The process of claim 10, wherein said polar compound is an organic compound containing an acidic inorganic residue attached to the organic residue, said organic compound being relatively non-volatile.

12. As a new product, a compounded mineral oil useful as a lubricant for metals, comprising a liquid mineral oil and a thickened, non-oxidized, heat-bodied fatty oil dispersed therein, said heat-bodied fatty oil containing an organic polar compound dissolved therein.

13. The product of claim 12 wherein said fatty oil contains an aromatic sulphonic acid dispersed therein.

14. In the manufacture of improved, compounded oils useful as a lubricant for metals, the improved process which comprises dispersing 2:5- dichlorbenzene sulfonic acid in an oil and then blending that mixture with a relatively large amount of mineral oil to obtain said compounded lubricant containing a minor amount of 2:5-dichlorbenzene sulfonic acid dispersed therein.

15. As a new product a compounded lubricant useful in lubricating metals, said lubricant comprising a major amount of a mineral oil and a relatively small amount of 2:5-dichlorbenzene sulfonic acid, the amount thereof not exceeding 30 per cent on the mineral oil.

LÁSZLÓ AUER.

CERTIFICATE OF CORRECTION.

Patent No. 2,213,943. September 10, 1940.

LÁSZLÓ AUER.

It is hereby certified that error appears in the printed specification of the above numbered patent requiring correction as follows: Page 1, first column, line 17, for "1936" read --1926--; page 7, second column, line 5, for "a lubricant" read --an improved mineral oil composition--; page 9, first column, line 67, claim 2, strike out the words and syllable "from mineral oils, said products having lubricat-" and insert the same after "products" in line 65, same claim; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.

CERTIFICATE OF CORRECTION.

Patent No. 2,213,943.  September 10, 1940.

LÁSZLÓ AUER.

It is hereby certified that error appears in the printed specification of the above numbered patent requiring correction as follows: Page 1, first column, line 17, for "1936" read --1926--; page 7, second column, line 5, for "a lubricant" read --an improved mineral oil composition--; page 9, first column, line 67, claim 2, strike out the words and syllable "from mineral oils, said products having lubricat-" and insert the same after "products" in line 65, same claim; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.